No. 689,135. Patented Dec. 17, 1901.
E. F. SHAW.
KNIFE HANDLE.
(Application filed Aug. 14, 1900.)
(No Model.)
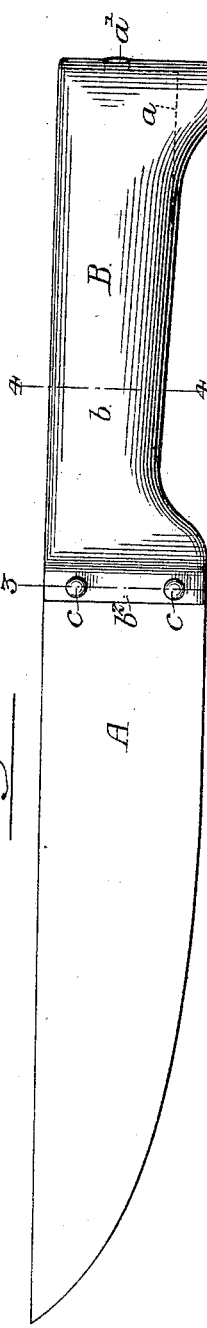
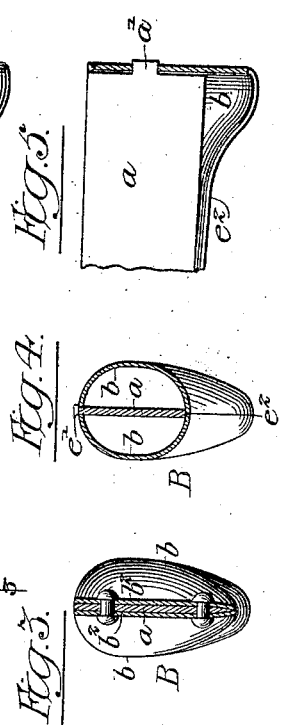
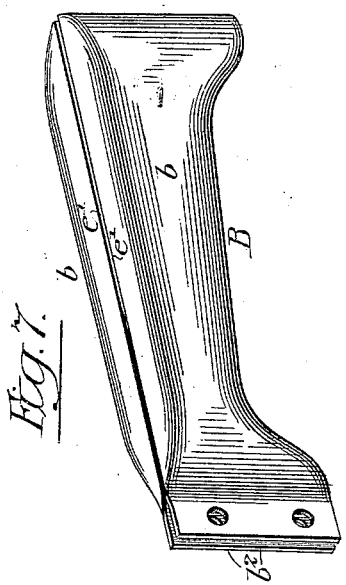
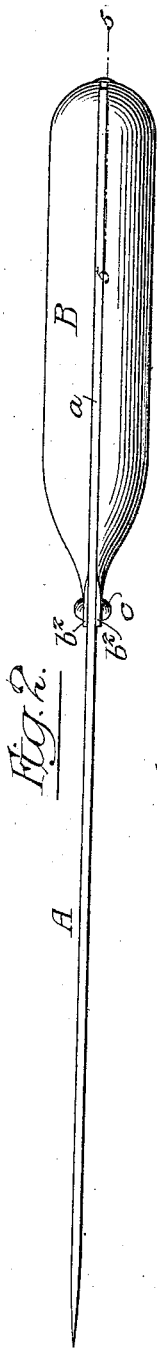
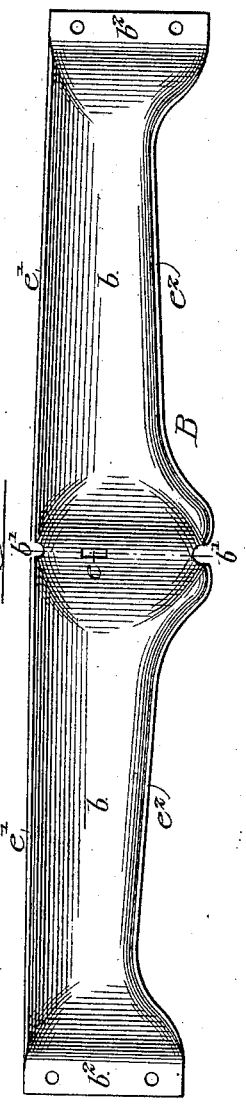
Witnesses:—
Inventor:—
Edwin F. Shaw.
by his Attorneys:—
Howson & Howson.

UNITED STATES PATENT OFFICE.

EDWIN F. SHAW, OF PHILADELPHIA, PENNSYLVANIA, ASSIGNOR TO HENRY DISSTON & SONS, INCORPORATED, OF PHILADELPHIA, PENNSYLVANIA, A CORPORATION OF PENNSYLVANIA.

KNIFE-HANDLE.

SPECIFICATION forming part of Letters Patent No. 689,135, dated December 17, 1901.

Application filed August 14, 1900. Serial No. 26,869. (No model.)

*To all whom it may concern:*

Be it known that I, EDWIN F. SHAW, a citizen of the United States, residing in Philadelphia, Pennsylvania, have invented certain Improvements in Knife-Handles, of which the following is a specification.

The main object of my invention is to so construct a handle for butcher and other knives that the entire knife can be sterilized without danger of destroying the handle; and a further object of the invention is to make a substantial handle which can be subjected to rough usage without liability of breaking. These objects I attain in the following manner, reference being had to the accompanying drawings, in which—

Figure 1 is a side view of a butcher-knife, illustrating my improved handle. Fig. 2 is a plan view. Fig. 3 is a section on the line 3 3, Fig. 1. Fig. 4 is a section on the line 4 4, Fig. 1. Fig. 5 is a section on the line 5 5, Fig. 2. Fig. 6 is a view of the handle-blank before being bent, and Fig. 7 is a view showing the bent handle detached.

My improved knife-handle is made of sheet metal, preferably sheet-steel, struck up in suitable form, bent, and applied to the knife-blade.

A is the blade having a shank $a$, which extends to the butt of the handle B, as shown clearly in Figs. 1 and 5. The handle B is stamped up out of a single sheet of metal, as illustrated in Fig. 6, having two sections $b$ $b$ bent on the line $b'$. At the opposite ends of the blank are the flanges $b^2$, Fig. 6, which are secured to the knife-blade A by rivets or other fastenings $c$ $c$.

It will be noticed that the shank $a$ of the blade extends to the butt of the handle, as mentioned above, and the shank has preferably a projection $a'$, which passes through an opening $e$ in the butt of the handle.

When the handle is in position on the knife and secured thereto by the rivets, the projection $a'$ is riveted to the butt and finished in the ordinary way, so that the handle is secured to the knife-blade by the riveted projection $a'$, as well as by the rivets $c$ $c$. It will be further noticed that the upper flanges $e'$ of the handle B bear against the sides of the shank $a$, as shown clearly in Fig. 4, while the lower flanges $e^2$ abut under the shank. This construction adds rigidity to the handle at the same time by having the lower flanges $e^2$ abutting. Any inequality in the shank will not interfere with the proper assembling of the knife and handle.

After the handle is attached to the blade it is finished by grinding or by other means, and the handle may be either fire-finished or plated, as desired.

In some instances the upper flanges $e'$ $e'$ may abut and the lower flanges $e^2$ may rest against the lower portion of the shank of the blade.

The design of the handle may be varied without departing from the main feature of my invention, and it will be understood that the handle may be applied to a knife or tool of any form.

I claim as my invention—

1. The combination of a knife-blade having a flat shank, with a handle made of a single sheet of metal pressed to shape forming the side sections having flanges at the upper and lower edges, the shank of the knife-blade extending to the rear of the handle and in contact throughout its entire length with the handle, and means for securing the handle to the blade, substantially as described.

2. The combination of a blade having a shank, a handle made of a single piece of metal pressed to shape and having two sections a flange on each section, said handle being bent to form a slot into which the shank extends, the shank having a projection at the rear, an opening at the butt of the handle through which the projection passes, and rivets for securing the flanges to the blade, substantially as described.

3. The combination of a blade having a shank, a handle made of a single sheet of metal pressed to shape forming the side sections, having flanges at the ends and flanges at the upper and lower edges, one of said flanges bearing against the sides of the shank of the blade and the other flanges abutting, and means for fastening the handle to the blade, substantially as described.

4. The combination of a blade having a flat shank, a handle made of a single sheet of metal pressed to shape forming the side sections, having flanges at the ends and flanges at the upper and lower edges, the flanges at the upper edge bearing against the sides of the shank of the blade, and the lower flanges abutting, and means for fastening the handle at one end to the blade and at the opposite end to the rear end of the shank, substantially as described.

In testimony whereof I have signed my name to this specification in the presence of two subscribing witnesses.

EDWIN F. SHAW.

Witnesses:
 WILL. A. BARR,
 ELIAS H. WHITE.